United States Patent
Turunen et al.

Patent Number: 5,196,179
Date of Patent: Mar. 23, 1993

[54] PROCESS FOR THE PRODUCTION OF HYDROGEN PEROXIDE

[75] Inventors: Ilkka Turunen; Eva-Liisa Mustonen, both of Oulu, Finland

[73] Assignee: Kemira Oy, Helsinki, Finland

[21] Appl. No.: 585,389

[22] Filed: Sep. 20, 1990

[30] Foreign Application Priority Data

Sep. 22, 1989 [FI] Finland .................................. 894502

[51] Int. Cl.$^5$ ............................................ C01B 15/023
[52] U.S. Cl. ....................................: 423/588; 552/208
[58] Field of Search ........................ 423/588; 552/208

[56] References Cited

U.S. PATENT DOCUMENTS 3,323,868  6/1967  Ogilvie et al. ...................... 423/588
4,541,997  9/1985  Bengt ................................. 423/588

Primary Examiner—Wayne Langel
Attorney, Agent, or Firm—Willian Brinks Olds Hofer Gilson & Lione

[57] ABSTRACT

The invention relates to a process for converting anthrahydroquinone dissolved in an organic solvent to hydrogen peroxide and anthraquinone by causing a mixture of oxygen and anthrahydroquinone to flow concurrently through a reaction zone. According to the invention, the mixture of oxygen and anthrahydroquinone is caused, as an almost continuous mixed dispersion, to flow through the tubular reaction zone at such a velocity that the vacuum-pipe velocity of the liquid therein is higher than 0.05 m/s. The ratio of the length of the tube used as the reactor to its diameter is at minimum approx 10, and it may contain a static mixer made up of one or several parts.

12 Claims, 1 Drawing Sheet

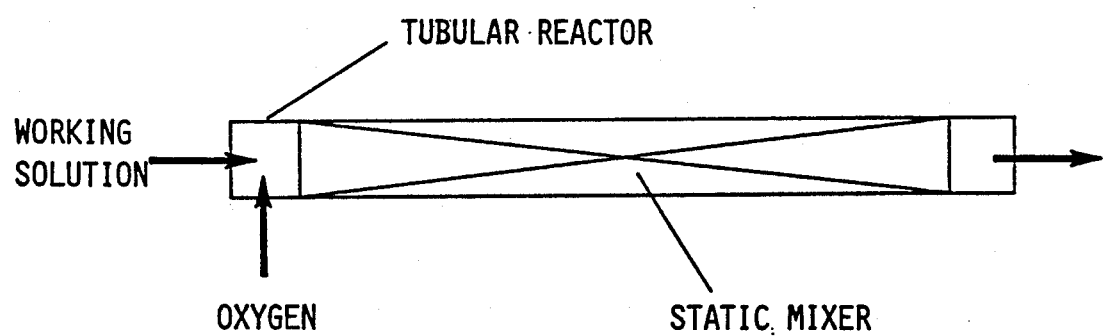

PROCESS FOR THE PRODUCTION OF HYDROGEN PEROXIDE

The present invention relates to a process for the production of hydrogen peroxide, and in particular to a process for converting anthrahydroquinone dissolved in an organic solvent to hydrogen peroxide and anthraquinone, by causing a mixture of oxygen and anthrahydroquinone to flow cocurrently through a reaction zone.

Instead of an organic solvent, the anthrahydroquinone can be dissolved in a mixture of different organic solvents, and the anthrahydroquinone can be oxidized not only with oxygen but also with a mixture of oxygen and some other gas, such as air. The invention also includes the oxidation of derivatives of anthrahydroquinone into the corresponding anthraquinone derivative and hydrogen peroxide.

It is known that hydrogen peroxide can be prepared by the so-called anthraquinone process. In this process the anthraquinone derivative is usually dissolved in an organic solvent made up of several constituents. The solution thus prepared, which, in accordance with the common practice, is hereinafter called the working solution, is first directed to the hydrogenation step. In the hydrogenation step, part of the anthraquinone derivative is reduced catalytically with hydrogen to the corresponding anthrahydroquinone derivative. Before the next step, i.e. oxidation, the catalyst is separated from the working solution. In the oxidation step the anthrahydroquinone derivative is oxidized with air or oxygen, whereby it returns to its pre-hydrogenation form, i.e. an anthraquinone derivative. At the same time hydrogen peroxide is formed according to the following equation:

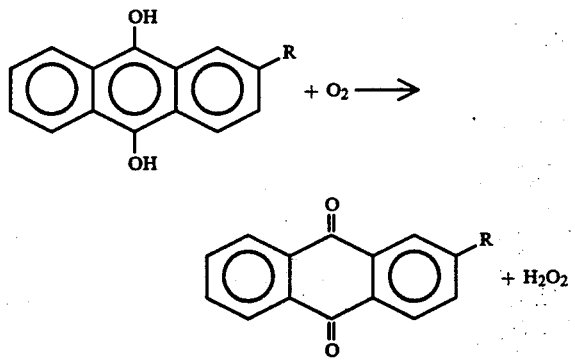

where R stands for a substituent known per se.

The hydrogen peroxide formed during the oxidation step is removed from the working solution by extracting it with water. In the extraction step, water passes into the working solution, which water is partly removed. After the drying, the working solution is returned to the hydrogenation. The aqueous solution of hydrogen peroxide, obtained from the extraction step, is purified and concentrated. (Kirk-Othmer, Encyclopedia of Chemical Technology, 3rd edition, Vol. 13, pages 16–21).

The oxidation step of the anthraquinone process is very important for the economy of the process, since considerable cost savings can therein be achieved. This is due primarily to the high energy consumption of the oxidation step; typically, more electric energy is used in the oxidation step than in the other steps of the working-solution cycle combined. In general, the oxidation reactor is also the largest device in the whole process and thus accounts for a considerable proportion of investment costs. The costs, as well as the fire load, essential in terms of safety, are also affected by the large quantity of working solution contained in the column.

The following four objectives are essential in the technical implementation of the oxidation step, i.e. in the selection of the type and size of the reactor and the reaction conditions:

1. Maximization of the conversion, i.e. it is desirable that as large a proportion as possible of the anthrahydroquinone derivative is oxidized. In practice the conversion is usually 95–100 %.
2. Minimization of detrimental secondary reactions, which may be caused, for example, by too high a temperature, too high a pressure, or too long a retention time of the working solution.
3. Minimization of the reactor volume.
4. Minimization of energy consumption.

Because of the great significance of the oxidation step it is understandable that numerous reactors of different types have been developed and patented. Most of the reactors developed are columns, either of a type packed with packing pieces or empty, in which the liquid and gas phases are contacted with each other in order to produce the desired reaction.

In a conventional cocurrent column in which the flows of the working solution and air are parallel, upward from below, the flow volume of the working solution calculated per cross-sectional area of the column is typically 36–72 $m^3/m^2h$ (U.S. Pat. No. 3,073,680). This patent emphasizes the importance of the size of the gas bubbles. When air is fed into the column through nozzles or through sinters, having sufficiently small openings, at least initially a small bubble size and thus also a large material-transfer interface between the gas and the liquid are achieved.

U.S. Pat. No. 2,902,347 proposes that the oxidation be carried out in a countercurrent column. A column of this type, however, has the disadvantage that, in order to prevent flooding, the air feed has to be kept relatively low. For this reason the volume of the column (or column combination comprising a plurality of columns) increases unreasonably.

There are a large number of references in the literature to the cocurrent oxidation column of Laporte Chemicals Ltd. (Chem. Age. 82, 895 (1958), Chem. and Ind., 1959, page 76, Chem. Process Eng. 40 No. 1, 5 (1959), Brit. Chem. Eng. 4, 88 (1959) and The Ind. Chemist 35, 9 (1959)).

U.S. Pat. No. 3,880,596 proposes that the oxidation be carried out in a column, made up of a plurality of sections, in which air or some other oxygen-containing gas flows through the entire column upward from below. The working solution flows in the same direction, but flows first through the topmost column section, thereafter through the section beneath the topmost section, etc., and last through the lowest column section. Thus the column sections operate cocurrently, but, in a way, the column as a whole operates countercurrently. According to the patent it is possible to direct working solution through such a column at 10–55 $m^3/m^2h$ and air at 370–2050 $Nm^3/m^2h$, both calculated per cross-sectional area of the column.

In the publication WO 86/06710 it is proposed that the oxidation be carried out so that, before being introduced into an empty cocurrent column, the air or oxygen-containing gas and the working solution are mixed in a nozzle to form a stable dispersion which flows through the column. It is claimed that in this way air can be directed through the column at 2000-3000 Nm$^3$/m$^2$h.

All of these column-type reactors, also those representing the latest state of the art, have two disadvantages as compared with the reactor used in the process according to the present invention. These disadvantages are the large reactor volume and the consequent long retention time of the liquid. The differences between the reactors in these respects will be clearly shown in the comparison example presented below.

Large reactor volume results in high equipment costs. In addition, the oxidation columns are often so large that they have a clear effect on plant size, space requirement, and construction costs. Costs are also incurred from the fact that the reactor is full of an expensive working solution, although part of the reactor volume is filled by air bubbles. The large quantity of the working solution also results in a large fire load.

Large reactor volume results in a long retention time of liquid in the reactor. The long retention time increases the decomposition of the hydrogen peroxide in the reactor and may promote the formation of detrimental products of secondary reactions.

The unstable behavior of the oxidation process can be regarded as a third disadvantage of column-type reactors, at least with certain column types. Of the volume of the mixture in the column, a few tens of per cent is gas. Such a dispersion in a dynamic state does not behave in a particularly stable manner; there tend to appear variations in gas volume, various canalization phenomena, and surface level fluctuations. These factors may make it difficult to control the operation of the column.

The object of the present invention is to eliminate the disadvantages involved in the above-mentioned processes known per se and in the use of their reactor types, and to provide a process for the production of hydrogen peroxide in the oxidation step of the anthraquinone process, which process does not require long retention times or large column-type reactors.

In the process according to the present invention, a mixture of oxygen and an anthrahydroquinone solution is caused, as an almost continuous mixed dispersion, to flow through a tubular reaction zone at such a velocity that the vacuum-pipe velocity of the liquid in it is higher than 0.05 m/s. Further objects and advantages will become apparent from the following description and the accompanying drawing.

One essential difference between the tubular reactor which is object to the present invention and the column-type reactors is associated with the flow velocity of the reacting substances in the reactor. In column-type reactors the vacuum-pipe velocity of the liquid is often only a few millimeters per second (U.S. Pat. No. 3,880,596; Example 1:3.36 mm/s, and Example 2:6.72 mm/s). By vacuum-pipe velocity is meant the liquid volume flow divided by the cross-sectional area of the reactor. The velocity of the gas in column-type reactors is dependent on the rising velocity of the bubbles and is in general clearly higher than the velocity of the liquid. In the process according to the present invention the velocities of the liquid and the gas are mutually of the same order of magnitude, since the phases form an almost continuous, flowing dispersion. The vacuum-pipe velocity of the liquid is much higher than in columns, higher than 0.05 m/s, such as 0.1-3 m/s, for example 0.3-1 m/s.

Oxygen or an oxygen-containing gas having an oxygen concentration higher than 90% by volume can be fed in not only at the beginning of the reaction zone but also at one or several points thereafter.

The retention time of the dispersion in the tubular reaction zone is shorter than conventionally. In a preferred embodiment of the invention the retention time is at maximum approx. 25 minutes, preferably 20 seconds 13 12 minutes, for example 70 seconds — 4 minutes.

The invention also relates to the use of such a tube as a reactor for converting, with the use of oxygen, anthrahydroquinone dissolved in an organic solvent to hydrogen peroxide and anthraquinone, the ratio of the length of the tube to its diameter being at minimum approx. 10, preferably more than 15. Such a tubular reactor may additionally be equipped with a static mixer made up of one or several parts.

In the process to which the present invention relates, the reactor used is not a column, as in reactors representing the latest state of the art, but a tubular reactor.

BRIEF DESCRIPTION OF DRAWING

The only FIGURE is a cross-sectional view of a tubular reactor according to the present invention.

The accompanying figure illustrates, in cross-section, the structural principle of the tubular reactor. The reactor comprises a vertical or horizontal tube which contains a static mixer made up of one or several parts. Oxygen or an oxygen-containing gas and the working solution are fed in at the beginning of the tube, and the dispersion formed by them flows through the tube at almost the same velocity. In principle, air can also be used as the oxidizing gas. However, when air is used, the partial pressure of oxygen at the end of the tube drops to so low a level that the tube may to to be made immoderately long. For this reason it is advisable to use in the reactor according to the invention pure or almost pure (>90% by vol.) oxygen. All of the oxygen or oxygen-containing gas is not necessarily fed in at the beginning of the tube, but the reactor may have a plurality of intermediate feed-in points for oxygen. The tube is provided with a cooling mantle and, when necessary, with intermediate coolers (not depicted).

The oxidizing gas most commonly used in column-type reactors is air, whereas in the reactor according to the present invention it is recommendable to use oxygen, which is more expensive. However, this price difference is compensated for through energy costs. The gas volume to be compressed in the reactor according to the invention is much smaller, since the oxygen content is 100%, or almost 100%, and furthermore, the oxygen can be utilized far more completely. In column-type reactors the oxygen content is typically 5% or more, which means that more than 20% of the oxygen of the air fed in remains unused, whereas in the reactor according to the invention more than 95% of the oxygen fed in can easily be used. Thus the smaller gas volume will result in lower energy costs. The energy consumed for the pumping of the liquid is small as compared with the compression energy, and furthermore, the liquid pumping efficiency required is approximately the same in the reactor types compared.

The tubular reactor used in the process according to the invention can easily be designed so that the use of pure oxygen does not substantially increase safety risks, as compared with the situation in which air is used.

In experimental runs on scale it has been observed that the reactor volume required in a tubular reactor operated in accordance with the invention is surprisingly much smaller than in column-type reactors. For this reason the retention time is also much shorter and the yield per volume unit is higher. These facts, and in certain cases also easier operation, can indeed be deemed to be the advantages of the invention as compared with prior art. The following comparison example illustrates the differences between the reactors.

EXAMPLE

A) Example 2 of U.S. Pat. No. 3,880,596 relating to a multiple-section cocurrent column describes oxidation in a column having a diameter of 3.7 m and an effective height (=height of the packing layer) of 15 m. Thus the total volume of the column is 161 m$^3$ Into the column there was fed, at 260 m$^3$h, a working solution which contained hydroquinones in such an amount that hydrogen peroxide at 9.45 kg/m$^3$ could be caused to form in the solution. When air at 10,000 Nm$^3$/h was fed into the column, a conversion of 98.3% was achieved, i.e. the hydrogen peroxide content obtained for the solution was 9.29 kg/m$^3$. The oxygen content of the outlet gas was 5.9%, which meant that approx. 24% of the oxygen of the feed air was wasted. The hydrogen peroxide yield calculated per total reactor volume was approx. 15 kg/h m$^3$.

B) The reactor according to the invention comprised two tubes in parallel, their diameter being 0.26 m, length 65 m, and the tubes containing static mixers. There were oxygen-feed units not only at the beginning of the tubes but also at several subsequent points in the tubes. The total reactor volume was 6.9 m$^3$. Working solution was fed into the reactor tubes at a combined rate of 200 m$^3$/h. The solution contained hydroquinones in such an amount that it was possible to cause hydrogen peroxide to form at 8.88 kg/m$^3$ in the solution. When pure oxygen was fed into the reactor at a total rate of 1242 m/h, the hydrogen peroxide content obtained for the working solution was 8.77 kg/m$^3$, which corresponds to a conversion of 98.7. Of the oxygen fed in, 7% was wasted. The hydrogen peroxide yield calculated per total reactor volume was 254 kg/h m$^3$.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the invention.

We claim:

1. A process for converting anthrahydroquinone dissolved in an organic solvent to hydrogen peroxide and anthraquinone wherein said process comprises causing a mixture of oxygen and anthrahydroquinone to flow concurrently through a reaction zone, wherein the mixture is caused, as an almost continuous dispersion, to flow through a tubular reaction zone at such a velocity that the vacuum-pipe velocity of the liquid therein is higher than 0.05 m/s wherein the oxygen or oxygen containing gas is fed in not only at the beginning of the reaction zone but also at one or more points thereafter.

2. A process according to claim 1, wherein the mixture is caused, as almost continuous dispersion, to flow through a tubular reaction zone at a vacuum-pipe velocity of 0.1-3 m/s.

3. A process according to claim 1, wherein the mixture is caused, as an almost continuous dispersion, to flow through a tubular reaction zone at a vacuum-pipe velocity of 0.3-1 m/s.

4. A process according to claim 2 wherein the retention time of the dispersion in the tubular reaction zone is at a maximum of approximately 25 min.

5. A process according to claim 3 wherein the retention time of the dispersion in the tubular reaction zone is at a maximum of approximately 25 min.

6. A process according to claim 2 wherein the retention time of the dispersion in the tubular reaction zone is 20 s-12 mins.

7. A process according to claim 3 wherein the retention time of the dispersion in the tubular reaction zone is 20 s-12 mins.

8. A process according to claim 2 wherein the retention time of the dispersion in the tubular reaction zone is 70 s-4 min.

9. A process according to claim 3 wherein the retention time of the dispersion in the tubular reaction zone is 70 s-4 min.

10. A process according to claim 1 wherein the retention time of the dispersion in the tubular reaction zone is at a maximum of approximately 25 minutes.

11. A process according to claim 1 wherein the retention time of the dispersion in the tubular reaction zone is 20 s-12 min.

12. A process according to claim 1 wherein the retention time of the dispersion in the tubular reaction zone is 70 s-4 min.

* * * * *

UNITED STATES PATENT AND TRADEMARK OFFICE
CERTIFICATE OF CORRECTION

PATENT NO. : 5,196,179
DATED : March 23, 1993
INVENTOR(S) : Ilkka Turunen et al.

It is certified that error appears in the above-indentified patent and that said Letters Patent is hereby corrected as shown below:

In column 2, line 64, delete "$Nm^3 3/m^2 h$" and substitute --$Nm^3/m^2h$--.

In column 4, lines 10-11, delete "seconds 13 12" and substitute --seconds - 12--.

In column 4, line 37, delete "to to".

In column 5, line 18, delete "260 $m^3 h$" and substitute --260 $m^3/h$--.

In column 5, line 39, delete "m/h" and substitute --$m^3/h$--.

Signed and Sealed this

Seventh Day of March, 1995

Attest:

BRUCE LEHMAN

Attesting Officer     Commissioner of Patents and Trademarks